D. P. GOSLINE.
BY-PASS VALVE.
APPLICATION FILED FEB. 9, 1914.

1,233,340.

Patented July 17, 1917.
2 SHEETS—SHEET 1.

WITNESSES —
M. E. Flaherty.
A. E. O'Brien.

INVENTOR
Daniel P. Gosline
By
Evan & Hayes
his attorneys.

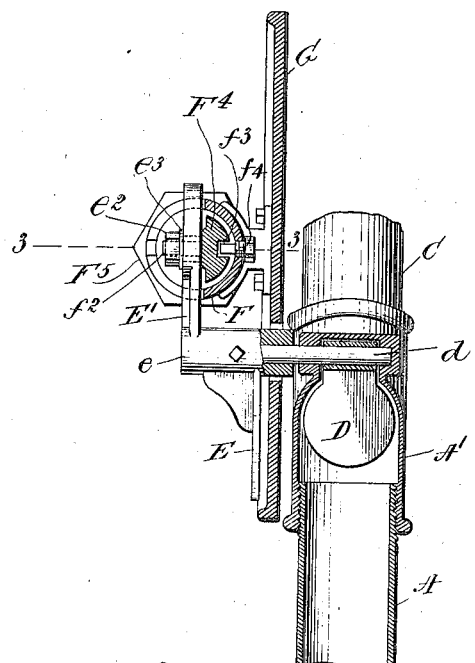

UNITED STATES PATENT OFFICE.

DANIEL P. GOSLINE, OF BOSTON, MASSACHUSETTS.

BY-PASS VALVE.

1,233,340.  Specification of Letters Patent.  Patented July 17, 1917.

Application filed February 9, 1914. Serial No. 817,659.

*To all whom it may concern:*

Be it known that I, DANIEL P. GOSLINE, a subject of George V, King of Great Britain and Ireland, and a resident of Boston, in the county of Suffolk and State of Massachusetts, have invented a new and useful Improvement in By-Pass Valves, of which the following is a specification.

The purpose of my invention is to provide a single valve which may be used in positions where a variable quantity of water is to be delivered from a constant supply for any purpose which requires a variable or regulated quantity, for example, a mechanism for humidifying air where considerable water is needed if the air is dry and much less when the air is moist. As the water comes from a constant supply provision must be made for disposing of the surplus water by means which will give instantly an added outlet when needed. For this purpose I have provided a Y-shaped valve casing provided with two seats one in each branch of the Y and a double-faced shutter or valve pivotally mounted to close against either seat or to partially close either branch of the Y so that the flow through both branches may be adjusted as occasion may require. Preferably such valve should be automatically operable by means of a thermostat, humostat or some other similar automatic mechanism such as is found on the market, so that the condition of the air in the delivery room shall be always under automatic control rather than under hand control which of course is not accurate. Such is the chief object of my invention, but it will be seen from the description of the device embodying it, shown in the drawings, that it may be otherwise used.

My invention will be understood by reference to the drawings in which it is shown in its preferred form.

Fig. 2 is a vertical section on the line 2—2 of Fig. 1.

Fig. 3 is a horizontal section on the line 3—3 of Fig. 2, and

Fig. 4 is a vertical section of the valve casing showing the valve or shutter, the valve seats and the passages controlled thereby.

Figure 1:
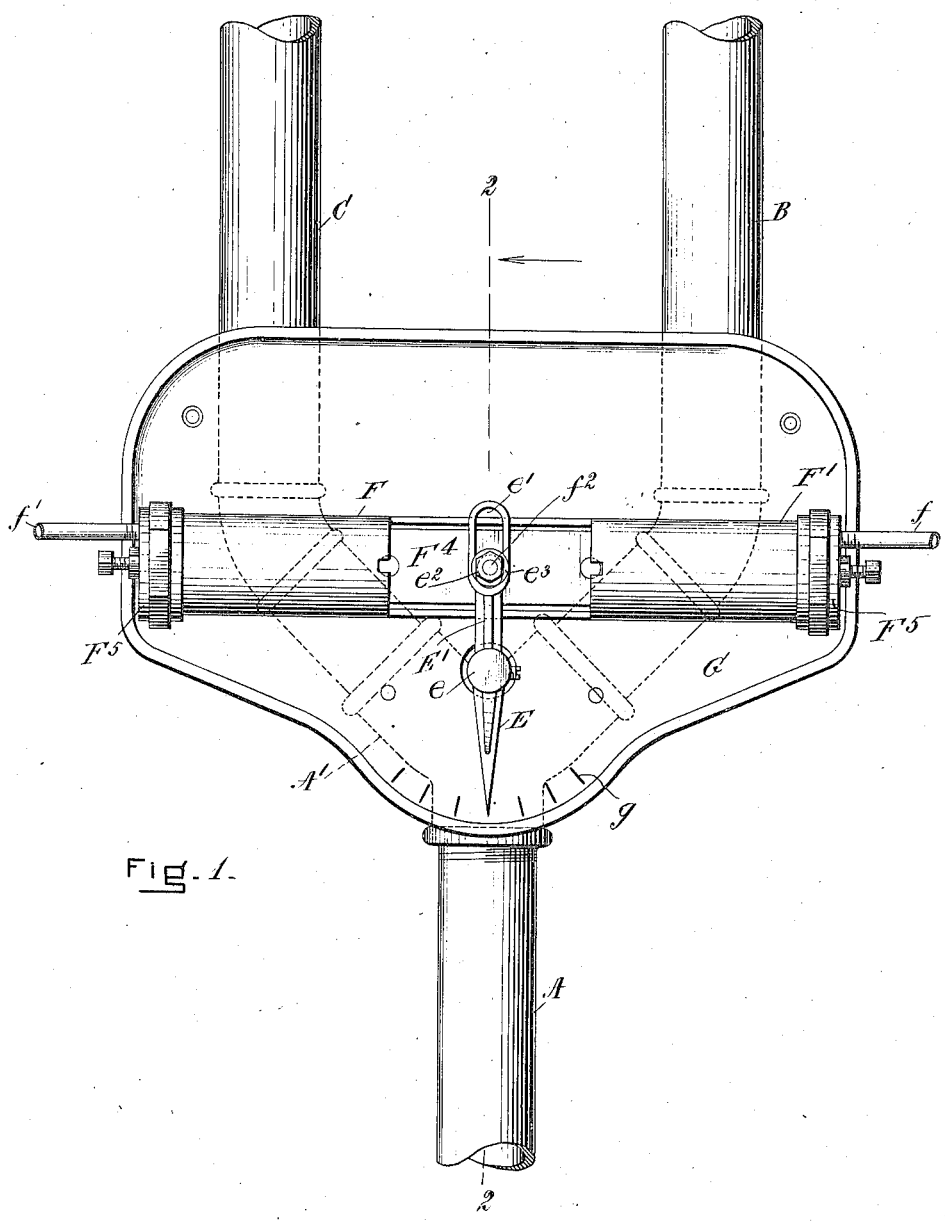
Figure 1 is a front elevation of the valve casing showing the supply pipe, the delivery pipe and the by-pass pipe with my apparatus attached thereto.

A is a pipe connected with a suitable supply, for example, a pump or other like means or even a street main, provided sufficient pressure can be secured therefrom. This pipe terminates in a Y $A^1$ from which lead two branches B and C, one of these branches, say C, leading back to a reservoir or otherwise disposing of any waste or surplus of water.

The valve or shutter is shown at D. It is double-faced and mounted on a shaft or pin $d$ supported in suitable bearings at the junction of the two arms of the Y, one of these bearings comprising a stuffing box through which the pin projects so as to be operated from the outside by a lever or the like.

Within the two arms of the Y-shaped valve casing are valve seats $b$ and $c$. These valve seats are in planes radial from the pin $d$ and coöperate one with each side of the valve D so that the motion of the valve in either direction from its central position will close one port as much as it opens the other and when the valve lies against either valve seat it will shut off the passage of water from the pipe A to that arm of the Y. Thus if a full supply of water is to be delivered through the pipe B to the humidifying apparatus or other point, the valve D is closed against the valve seat $c$ and all the water can pass into the pipe B. If, however, it is desired to cut off the water supply from the pipe B the valve D is closed against the valve seat $b$ in which case the entire water supply passes to the pipe C and from thence to the waste wherever it may be. When the valve stands in the position shown in Fig. 4 it will be noted that the supply through the pipe A is divided substantially equally and a portion of it passes through each pipe B and C. By adjusting the position of the valve, therefore, the supply to the pipe B may be adjusted as occasion may require. The positions of the valve are regulated by automatic means connected thereto as follows:—

The means employed for turning the pin $d$ and hence moving the valve comprises a cap $e$ mounted on one end of the shaft $d$ which cap carries an arm E made in the form of a pointer to indicate the position of the valve within the casing, and a second arm $E^1$ which is slotted at $e^1$ in order to be adjusted automatically in the way now to be described.

As a means for automatically changing the position of the valve I use a slide comprising two cylinders F, $F^1$ within each of which slides a piston $F^2$, $F^3$, one attached to each end of a plate or flat rod $F^4$. Each cylinder is closed at its outer end by a cap $F^5$ and into each cap passes a tube $f, f^1$, this arrangement being such that upon the application of steam or compressed air to the pipe $f$ the piston mechanism will be thrown to the left (see Fig. 3), while if suitable pressure is applied through the pipe $f^1$ the piston mechanism will be driven in the opposite direction.

The slot $e^1$ in the arm $E^1$ is for the purpose of connecting the valve pin $d$ to the flat plate or rod $F^4$ by means of the arm $E^1$ so that the valve may be moved thereby. For this purpose a threaded pin $f^2$ projects from the rod $F^4$ through the slot $e^1$ and a nut $e^2$ is screwed onto the end of the pin $f^2$, thus holding the parts together. Preferably a friction ring $e^3$ lies between the pin $e^2$ and the walls of the slot $e^1$.

To serve as guides for the piston rod or plate $F^4$ I prefer to groove the rear side of this plate as at $f^3$ and provide a plurality of guide pins $f^4$ the tips of which are squared to run easily in said groove, these pins passing through the rear wall of the cylinder F.

In practice and as shown the cylinder is mounted in any suitable way on a plate G which lies between the cylinder and the valve casing A, B and C, and this plate may have a scale $g$ upon it in such relation to the end of the pointer E that it will indicate the position of the valve D which of course cannot be seen.

Adjustable stops $f^5$ carrying check nuts $f^6$ are provided in the caps $F^5$ to adjust the possible throw of the piston in either direction if desired.

The valve in this case is a double-faced valve, the two faces being alike and the two valve seats being alike, each adapted to seat the valve practically watertight or otherwise if desired.

This valve and the mechanism by which it is controlled has been designed by me especially for use in supplying water to an air humidifier of a character now well known, and it is especially intended to be used with a humostat of a kind well known in the market (such for example as the Johnson humostat) which will control fluid pressure supplied to the pipes $f, f^1$ so that when, for example, the humidity in the room in which the humidifier is operating has reached the maximum desired percentage, then from some suitable source controlled by the humostat pressure will be supplied to the pipe $f$ which pressure will move the piston $F^2$ and so partially or entirely close the valve or shutter D against the seat $b$, thus cutting off some or all of the water supply from the pipe B and diverting it through the by-pass C. When the moisture in the room containing the humidifier becomes less than the stipulated percentage, the pressure at $f$ is automatically shut off and pressure is applied to the pipe $f^1$, when the reverse of this operation takes place and a wider opening is provided for the pipe B, the opening to the pipe C being reduced.

It is evident, however, that an apparatus of this character has other uses and that it may be used for steam or other liquid as well as for water. Moreover, I do not mean to limit myself to the precise form of apparatus shown in the drawings.

What I claim as my invention is:—

A device of the kind described comprising a Y-shaped valve casing, a shaft carrying a valve mounted in the fork of said Y, whereby said valve will be adapted to control the entrance to both branches of said Y, an arm mounted on said shaft, operating means comprising a slide connected intermediate its ends with said arm, means for guiding said slide, a piston secured to each end of said slide, separate cylinders within which said pistons are located, respectively, each cylinder having a fluid pressure inlet at its outer end, whereby pressure applied at either inlet will move the corresponding piston thereby to open or close the corresponding branch, and means in the head of each cylinder to adjust the length of stroke of the corresponding piston.

DANIEL P. GOSLINE.

Witnesses:
GEORGE O. G. COALE,
M. E. FLAHERTY.